United States Patent
Magness

(10) Patent No.: US 12,253,685 B2
(45) Date of Patent: Mar. 18, 2025

(54) ASYMMETRIC INPUT INTENSITY HEXAGONAL HOMOGENIZER

(71) Applicant: LEONARDO ELECTRONICS US INC., Tucson, AZ (US)

(72) Inventor: Connor L. Magness, Tucson, AZ (US)

(73) Assignee: LEONARDO ELECTRONICS US INC., Tucson, AZ (US)

( * ) Notice: Subject to any disclaimer, the term of this patent is extended or adjusted under 35 U.S.C. 154(b) by 619 days.

(21) Appl. No.: 17/022,767

(22) Filed: Sep. 16, 2020

(65) Prior Publication Data

US 2021/0080736 A1    Mar. 18, 2021

Related U.S. Application Data

(60) Provisional application No. 62/901,078, filed on Sep. 16, 2019.

(51) Int. Cl.
G02B 27/09    (2006.01)
G02B 3/00    (2006.01)

(52) U.S. Cl.
CPC ......... G02B 27/0961 (2013.01); G02B 3/005 (2013.01); G02B 3/0062 (2013.01)

(58) Field of Classification Search
CPC .. G02B 27/0961; G02B 3/005; G02B 3/0062; G02B 27/0927
See application file for complete search history.

(56) References Cited

U.S. PATENT DOCUMENTS

| | | | |
|---|---|---|---|
| 3,711,939 A | 1/1973 | Stoll | 228/246 |
| 3,805,375 A | 4/1974 | LaCombe et al. | 29/832 |
| 3,936,322 A | 2/1976 | Blum et al. | 148/1.5 |
| 4,092,614 A | 5/1978 | Sakuma et al. | |
| 4,156,879 A | 5/1979 | Lee | 357/22 |
| 4,306,278 A | 12/1981 | Fulton et al. | 362/259 |
| 4,653,056 A | 3/1987 | Baer et al. | |
| 4,767,674 A | 8/1988 | Shirai | 257/E23.006 |
| 4,803,691 A | 2/1989 | Scifres et al. | 372/150 |
| 4,813,762 A | 3/1989 | Leger | H01S 5/4062 |
| 4,881,237 A | 11/1989 | Donnelly | |
| 4,903,274 A | 2/1990 | Taneya et al. | |
| 4,947,401 A | 8/1990 | Hinata et al. | |
| 4,980,893 A | 12/1990 | Thornton et al. | |

(Continued)

FOREIGN PATENT DOCUMENTS

| | | | |
|---|---|---|---|
| CA | 2 208 370 C | 7/2005 | |
| CN | 207352292 | 5/2018 | ............. G02B 27/09 |

(Continued)

OTHER PUBLICATIONS

Computer Translation of WO2019063733 (Year: 2019).*

(Continued)

*Primary Examiner* — Collin X Beatty
(74) *Attorney, Agent, or Firm* — HAYES SOLOWAY P.C.

(57) ABSTRACT

An optical beam homogenizer includes a first hexagonal microlens array having a plurality of hexagonal lenslets. Each lenslet has a hexagonal clear aperture. A second hexagonal microlens array is spaced away from the first hexagonal microlens array at a focal length of the first hexagonal microlens array and has a plurality of hexagonal lenslets. Each lenslet in the second hexagonal microlens array has a non-hexagonal clear aperture.

16 Claims, 6 Drawing Sheets

(56) References Cited

U.S. PATENT DOCUMENTS

| | | | |
|---|---|---|---|
| 4,993,148 A | 2/1991 | Adachi | 174/252 |
| 5,008,737 A | 4/1991 | Burnham et al. | 357/81 |
| 5,027,359 A | 6/1991 | Leger | H01S 3/005 |
| 5,031,187 A | 7/1991 | Orenstein et al. | |
| 5,033,060 A | 7/1991 | Leger | G02B 6/425 |
| 5,040,187 A | 8/1991 | Karpinski | |
| 5,045,972 A | 9/1991 | Supan | C22C 26/00 |
| 5,060,237 A | 10/1991 | Peterson | |
| 5,061,974 A | 10/1991 | Onodera et al. | |
| 5,099,488 A | 3/1992 | Ahrabi et al. | |
| 5,102,825 A | 4/1992 | Brennan et al. | 437/129 |
| 5,105,429 A | 4/1992 | Mundinger et al. | |
| 5,105,430 A | 4/1992 | Mundinger et al. | |
| 5,128,951 A | 7/1992 | Karpinski | |
| 5,139,609 A | 8/1992 | Fields | H01S 3/09415 |
| 5,202,706 A | 4/1993 | Hasegawa | 359/819 |
| 5,212,706 A | 5/1993 | Jain | |
| 5,212,707 A | 5/1993 | Heidel et al. | |
| 5,253,260 A | 10/1993 | Palombo | 372/34 |
| 5,284,790 A | 2/1994 | Karpinski | |
| 5,298,762 A | 3/1994 | Ou | 257/13 |
| 5,305,344 A | 4/1994 | Patel | |
| 5,311,530 A | 5/1994 | Wagner et al. | 372/36 |
| 5,311,535 A | 5/1994 | Karpinski | |
| 5,325,384 A | 6/1994 | Herb et al. | |
| 5,394,426 A | 2/1995 | Joslin | |
| 5,418,799 A | 5/1995 | Tada | |
| 5,440,577 A | 8/1995 | Tucker | |
| 5,450,430 A | 9/1995 | Chang | 372/38 |
| 5,455,738 A | 10/1995 | Montesano et al. | 361/707 |
| 5,497,391 A | 3/1996 | Paoli | |
| 5,504,767 A | 4/1996 | Jamison et al. | |
| 5,521,931 A | 5/1996 | Biegelsen et al. | 372/36 |
| 5,526,373 A | 6/1996 | Karpinski | |
| 5,568,498 A | 10/1996 | Nilsson | |
| 5,592,333 A | 1/1997 | Lweis | H01S 5/4062 |
| 5,593,815 A | 1/1997 | Ahn | 430/321 |
| 5,627,850 A | 5/1997 | Irwin et al. | |
| 5,644,586 A | 7/1997 | Kawano et al. | |
| 5,661,747 A | 8/1997 | Hiiro | H01A 5/4062 |
| 5,679,963 A | 10/1997 | Klem et al. | 257/46 |
| 5,764,675 A | 6/1998 | Juhala | |
| 5,778,020 A | 7/1998 | Gokay | |
| 5,783,316 A | 7/1998 | Colella et al. | |
| 5,793,784 A | 8/1998 | Wagshul | H01S 5/4062 |
| 5,802,092 A | 9/1998 | Endriz | G02B 19/0057 |
| 5,812,573 A | 9/1998 | Shiomi et al. | |
| 5,835,515 A | 11/1998 | Huang | |
| 5,835,518 A | 11/1998 | Mundinger et al. | 372/50 |
| 5,848,083 A | 12/1998 | Haden et al. | 372/36 |
| 5,856,990 A | 1/1999 | Nilsson | 359/344 |
| 5,887,096 A | 3/1999 | Du | H01S 5/4025 |
| 5,909,458 A | 6/1999 | Freitas et al. | 372/36 |
| 5,913,108 A | 6/1999 | Stephens et al. | |
| 5,923,692 A | 7/1999 | Staskus et al. | |
| 5,930,279 A | 7/1999 | Apollonov et al. | 372/50 |
| 5,987,045 A | 11/1999 | Albares | 372/38 |
| 6,031,285 A | 2/2000 | Nishibayashi | |
| 6,101,208 A | 8/2000 | Gokay | |
| 6,208,677 B1 | 3/2001 | Moyer | 372/66 |
| 6,252,179 B1 | 6/2001 | Lauffer | 174/255 |
| 6,281,471 B1 | 8/2001 | Smart | 219/121.62 |
| 6,295,307 B1 | 9/2001 | Hoden et al. | 372/36 |
| 6,352,873 B1 | 3/2002 | Hoden | 438/28 |
| 6,396,857 B1 | 5/2002 | Labranche | |
| 6,400,513 B1 | 6/2002 | Southwell | G02B 27/123 |
| 6,424,667 B1 | 7/2002 | Endriz et al. | |
| 6,480,514 B1 | 11/2002 | Lorenzen et al. | 372/35 |
| 6,493,148 B1 | 12/2002 | Anikitchev | G02B 27/143 |
| 6,493,373 B1 | 12/2002 | Boucart | 257/33.069 |
| 6,535,533 B2 | 3/2003 | Lorenzen et al. | 372/34 |
| 6,535,541 B1 | 3/2003 | Boucart et al. | 372/96 |
| 6,542,531 B2 | 4/2003 | Sirbu | B82Y 20/00 |
| 6,727,117 B1 | 4/2004 | McCoy | |
| 6,865,200 B2 | 3/2005 | Takigawa et al. | |
| 7,016,383 B2 | 3/2006 | Rice | |
| 7,286,359 B2 | 10/2007 | Khbeis et al. | |
| 7,359,413 B2 | 4/2008 | Tzuk et al. | 372/34 |
| 7,529,286 B2 | 5/2009 | Gokay et al. | 372/69 |
| 7,539,232 B1 | 5/2009 | Corcoran | H01S 3/0805 |
| 7,580,189 B2 | 8/2009 | Urey | G02B 3/0062 |
| 7,660,335 B2 | 2/2010 | Thiagarajan et al. | 372/34 |
| 7,864,825 B2 | 1/2011 | Thiagarajan et al. | 372/36 |
| 7,944,955 B2 | 5/2011 | Thiagarajan et al. | 372/34 |
| 8,017,935 B2 | 9/2011 | Staszewski et al. | 257/27 |
| 8,653,550 B2 | 2/2014 | Mastro | H01L 33/40 |
| 8,664,524 B2 | 3/2014 | Garnett | H01L 31/02966 |
| 8,848,753 B2 | 9/2014 | Koenning | 372/29.021 |
| 9,256,073 B2 | 2/2016 | Chann | G02B 5/18 |
| 10,120,149 B1 | 11/2018 | Mathai | G02B 6/425 |
| 11,108,214 B2 | 8/2021 | Kobayashi | H01S 3/08054 |
| 11,327,325 B2 | 5/2022 | Li et al. | G02B 27/09 |
| 2001/0017870 A1 | 8/2001 | Hayakawa | 372/40 |
| 2002/0001864 A1 | 1/2002 | Ishikawa et al. | |
| 2002/0009106 A1 | 1/2002 | Miyokawa et al. | |
| 2002/0014631 A1 | 2/2002 | Iwata | 257/89 |
| 2002/0025096 A1 | 2/2002 | Wang et al. | 385/8 |
| 2002/0086483 A1 | 7/2002 | Kim | 438/264 |
| 2002/0086486 A1 | 7/2002 | Tanaka | H01L 21/28518 |
| 2003/0116767 A1 | 6/2003 | Kneissl et al. | 257/79 |
| 2004/0037340 A1 | 2/2004 | Yanagisawa | |
| 2004/0052280 A1 | 3/2004 | Rice | |
| 2004/0082112 A1 | 4/2004 | Stephens | |
| 2004/0125459 A1 | 7/2004 | Tanitsu et al. | 359/619 |
| 2004/0264521 A1 | 12/2004 | Ness et al. | |
| 2005/0087849 A1 | 4/2005 | Morita | H01L 24/48 |
| 2005/0095755 A1 | 5/2005 | Nakata et al. | |
| 2005/0232628 A1 | 10/2005 | Von Freyhold et al. | 398/41 |
| 2005/0254539 A1 | 11/2005 | Klimek | |
| 2006/0011938 A1 | 1/2006 | Debray | 257/104 |
| 2006/0045144 A1 | 3/2006 | Karsen | H01S 5/4031 |
| 2006/0197100 A1 | 9/2006 | Shen | 257/94 |
| 2007/0116079 A1 | 5/2007 | Giniunas et al. | 372/69 |
| 2007/0273957 A1 | 11/2007 | Zalevsky | G02B 27/1093 |
| 2008/0089380 A1 | 4/2008 | Konig et al. | 372/75 |
| 2008/0123710 A1 | 5/2008 | Brick | B82Y 20/00 |
| 2008/0130223 A1 | 6/2008 | Nakamura | H02M 7/003 |
| 2008/0170598 A1 | 7/2008 | Kireev | H01S 5/4062 |
| 2008/0213710 A1 | 9/2008 | Schultz | F23N 1/027 |
| 2008/0259983 A1 | 10/2008 | Trococoli | 372/6 |
| 2009/0015185 A1 | 1/2009 | Yoshida | 318/504 |
| 2009/0090932 A1 | 4/2009 | Bour et al. | 257/103 |
| 2010/0012188 A1 | 1/2010 | Garnett | 136/260 |
| 2011/0051759 A1 | 3/2011 | Telford | 372/35 |
| 2011/0063701 A1 | 3/2011 | Yankov | G02B 6/124 |
| 2011/0103409 A1 | 5/2011 | Sipes | G02B 6/4296 |
| 2011/0241549 A1 | 10/2011 | Wootton | 315/117 |
| 2011/0280269 A1 | 11/2011 | Ghang-Hasnain | H01S 5/105 |
| 2012/0043875 A1 | 2/2012 | Seo | H01L 23/3677 |
| 2012/0114001 A1 | 5/2012 | Fang et al. | 372/45.01 |
| 2012/0153254 A1 | 6/2012 | Mastro | 257/13 |
| 2012/0252144 A1 | 10/2012 | Schroeder et al. | 438/26 |
| 2012/0287958 A1 | 11/2012 | Lell | H01S 5/323 |
| 2013/0016752 A1 | 1/2013 | Lell | H01S 5/323 |
| 2013/0112667 A1 | 5/2013 | Holmgren | G02B 27/0961 |
| 2013/0259074 A1 | 10/2013 | Newman | H01S 3/04 |
| 2013/0271959 A1 | 10/2013 | Woodgate | G09F 13/04 |
| 2014/0064305 A1 | 3/2014 | Sipes | G02B 19/0014 |
| 2014/0084452 A1 | 3/2014 | Nagamatsu | H01L 21/561 |
| 2014/0293554 A1 | 10/2014 | Shashkov | 361/748 |
| 2015/0063387 A1 | 3/2015 | Joseph et al. | H01S 5/02438 |
| 2015/0162478 A1 | 6/2015 | Fafard | 257/461 |
| 2015/0207011 A1 | 7/2015 | Gamett | H01L 31/0368 |
| 2015/0207294 A1 | 7/2015 | Brick et al. | H01S 5/10 |
| 2015/0255960 A1 | 9/2015 | Kanskar | H01S 5/4075 |
| 2016/0014878 A1 | 1/2016 | Kilhenny | 257/99 |
| 2016/0147025 A1 | 5/2016 | Sakamoto | G02B 27/0905 |
| 2016/0192473 A1 | 6/2016 | Kasashima | 174/251 |
| 2016/0366757 A1 | 12/2016 | Kobayashi | H05K 1/0204 |
| 2017/0051884 A1 | 2/2017 | Raring | |
| 2017/0288367 A1 | 10/2017 | Taniguchi | |
| 2017/0338194 A1 | 11/2017 | Gittemeier | |
| 2018/0152000 A1 | 5/2018 | Crawford et al. | H01S 5/02288 |

(56) References Cited

U.S. PATENT DOCUMENTS

| | | | |
|---|---|---|---|
| 2018/0254606 A1 | 9/2018 | McElhinney et al. | |
| | | | H01S 5/02484 |
| 2018/0261975 A1 | 9/2018 | Pavlov | |
| 2018/0335582 A1 | 11/2018 | Ishige | |
| 2018/0337513 A1 | 11/2018 | Crawford et al. | H01S 5/3095 |
| 2020/0027839 A1 | 1/2020 | Hino | H01L 23/49 |
| 2020/0028332 A1 | 1/2020 | Kobayashi | G02B 3/06 |
| 2020/0075529 A1 | 3/2020 | Otsuka | |
| 2021/0080736 A1 | 3/2021 | Magness | G02B 27/09 |

FOREIGN PATENT DOCUMENTS

| | | | |
|---|---|---|---|
| DE | 968430 | 2/1958 | |
| DE | 19518177 | 11/1996 | H01S 3/0941 |
| DE | 10062579 | 6/2001 | |
| DE | 102008040374 | 1/2010 | H01S 5/40 |
| EP | 1439618 | 7/2004 | H01S 5/024 |
| EP | 1452614 | 9/2004 | H01S 5/024 |
| EP | 1811617 | 7/2007 | H01S 5/024 |
| EP | 1887666 | 2/2008 | H01S 5/024 |
| EP | 2110903 | 10/2009 | H01S 5/00 |
| EP | 2305400 | 4/2011 | B22D 19/00 |
| FR | 2902532 A1 * | 12/2007 | G02B 27/0927 |
| JP | 2002111058 | 4/2002 | H01L 33/00 |
| WO | WO2008006505 | 1/2008 | H01S 5/4062 |
| WO | WO-2013175549 A1 * | 11/2013 | G02B 26/0833 |
| WO | WO-2019063733 A1 * | 4/2019 | G02B 27/0905 |

OTHER PUBLICATIONS

Machine translation of FP2902532 (Year: 2007).*
Machine Translation of WO2013175549 (Year: 2013).*
Official Action issued in corresponding U.S. Appl. No. 16/539,889, dated May 11, 2021, 21 pages.
International Preliminary Report on Patentability issued in International Application Serial No. PCT/US2019/046410, dated Feb. 16, 2021, 6 pages.
European Search Report issued in corresponding European Patent Application Serial No. EP 20 19 646.6, dated Feb. 16, 2021, 7 pages.
Chinese Official Action issued in related Chinese Patent Application Serial No. 201780073945.8, dated Sep. 21, 2020 (16 pages) with translation.
Official Action issued in Applicants' corresponding EPO Application Serial No. 07117048.7-2222, dated Aug. 6, 2009, 4 pages.
Official Action issued in Applicants' corresponding EPO Application Serial No. 07117048.7-2222, dated Nov. 20, 2008, 9 pages.
Intention to Grant issued in Applicants' corresponding EPO Application Serial No. 09157643.9, dated Apr. 7, 2017, 6 pages.
Official Action issued in Applicants' corresponding EPO Application Serial No. 09157643.9, dated Aug. 22, 2016, 5 pages.
Official Action issued in Applicants' corresponding EPO Application Serial No. 09157643.9, dated Apr. 16, 2014, 2 pages.
European Search Report issued in application No. 09157643.9, dated Aug. 9, 2013 (7 pgs).
European Search Report issued in application No. 20150730.8, dated Jul. 3, 2020 (8 pgs).
Intention to Grant issued in Applicants' corresponding EPO Application Serial No. 16172620.3, dated Jul. 19, 2019, 3 pages.
European Search Report issued in application No. 18173282.7-1211, dated Oct. 8, 2018 (8 pgs).
Intention to Grant issued in Applicants' corresponding EPO Application Serial No. 06845311.7, dated Nov. 9, 2010, 5 pages.
European Search Report issued in application No. 06845311.7, dated Mar. 31, 2010 (9 pgs).
Official Action issued in European application No. 18173282.7-1211, dated Jan. 23, 2020 (6 pgs).
European Search Report issued in application No. 16172620.3, dated Oct. 25, 2016 (9 pgs).
European Search Report issued in application No. 20150730.8, dated Jul. 3, 2020 (9 pages).

European Supplemental Search Report issued in related European Patent Application 17875888.4, dated Jul. 9, 2020 (11 pages).
Feng, et al., "High efficient GaN-based laser diodes with tunnel junction", Applied Physics Letters 103, AIP Publishing, LLC, 2013.
Rieprich, et al., "Proceedings of SPIE—Assessment of factors regulating the thermal lens profile and lateral brightness in high power diode lasers", SPIEL ASE, 2017.
Office Action issued in U.S. Appl. No. 15/363,874, dated Jul. 18, 2019 (24 pgs).
Office Action issued in U.S. Appl. No. 15/363,874, dated Apr. 24, 2018 (10 pgs).
Office Action issued in U.S. Appl. No. 15/363,874, dated Feb. 14, 2019 (13 pgs).
Office Action issued in U.S. Appl. No. 15/363,874, dated Mar. 6, 2020 (12 pgs).
Office Action issued in U.S. Appl. No. 15/363,874, dated Jun. 15, 2020 (12 pgs).
Office Action issued in U.S. Appl. No. 15/363,874, dated Oct. 14, 2020 (11 pgs).
Office Action issued in U.S. Appl. No. 15/363,874, dated Oct. 4, 2018 (14 pgs).
Notice of Allowance issued in U.S. Appl. No. 15/363,874, dated Feb. 2, 2021 (7 pgs).
Office Action issued in U.S. Appl. No. 14/728,923, dated Aug. 9, 2018 (17 pgs).
Office Action issued in U.S. Appl. No. 14/728,923, dated Apr. 19, 2018 (16 pgs).
Office Action issued in U.S. Appl. No. 14/728,923, dated Oct. 2, 2017 (11 pgs).
Office Action issued in U.S. Appl. No. 12/105,126, dated Jul. 23, 2009 (7 pgs).
Office Action issued in U.S. Appl. No. 12/105,126, dated Apr. 24, 2009 (8 pgs).
Notice of Allowance issued in U.S. Appl. No. 12/105,126, dated Sep. 22, 2009 (7 pgs).
Notice of Allowance issued in U.S. Appl. No. 12/648,141, dated Jan. 11, 2011 (11 pgs).
Office Action issued in U.S. Appl. No. 16/539,889, dated Feb. 1, 2021 (18 pgs).
Office Action issued in U.S. Appl. No. 16/539,889, dated Oct. 21, 2020 (16 pgs).
Office Action issued in U.S. Appl. No. 16/539,889, dated Jul. 1, 2020 (19 pgs).
Office Action issued in U.S. Appl. No. 11/299,029, dated Aug. 22, 2008 (8 pgs).
Office Action issued in U.S. Appl. No. 16/540,961, dated Nov. 17, 2020 (13 pgs).
Office Action issued in U.S. Appl. No. 16/540,961, dated Aug. 5, 2020 (9 pgs).
Office Action issued in U.S. Appl. No. 11/829,030, dated Nov. 30, 2009 (16 pgs).
Office Action issued in U.S. Appl. No. 11/829,030, dated Jun. 24, 2009 (13 pgs).
Office Action issued in U.S. Appl. No. 11/829,030, dated Apr. 3, 2009 (13 pgs).
Office Action issued in U.S. Appl. No. 11/829,030, dated Nov. 12, 2008 (12 pgs).
Notice of Allowance issued in U.S. Appl. No. 11/829,030, dated Aug. 30, 2010 (7 pgs).
Giri et al, "Influence of Hot Electron Scattering and Electron-Phonon Interactions on Thermal Boundary Conductance at Metal/Nonmetal Interfaces" Journal of Heat Transfer, vol. 136, dated Sep. 2014 (6 pgs).
Martin et al., "Thermal Behavior of Visible AlGaInP-GaInP Ridge Laser Diodes" IEEE Journal of Quantum Electronics, vol. 28, No. 11, dated Nov. 1992 (7 pgs).
Monachon , C., "Thermal Boundary Conductance Between Metals and Dielectrics" thesis for the graduation of Doctor of Science, Federal Institute of Technology in Lausanne, 2013 (251 pgs).
Nekorkin et al., "Nonlinear mode mixing in dual-wavelength semiconductor lasers with tunnel junctions", Applied Physics Letters 90, 171106 (2007) (3 pgs).

(56) References Cited

OTHER PUBLICATIONS

Notice of Allowance issued in U.S. Appl. No. 15/601,820, dated Jun. 11, 2019 (8 pgs).
Rieprich et al., "Assessment of Factors Regulating the Thermal Lens Profile and Lateral Brightness in High Power Diode Lasers" Proc of SPIE, vol. 10085, No. 1008502-1, dated 2017 (10 pgs).
Zhang et al., "Thermal Transport Across Metal-Insulator Interface via Electron-Phonon Interaction," Journal of Physics Condensed Matter, dated Oct. 2013 (15 pgs).
International Preliminary Report on Patentability issued in application No. PCT/US2017/057209, dated Jun. 4, 2019 (8 pgs).
International Search Report and Written Opinion issued in corresponding PCT Patent Appln. Serial No. PCT/US17/57209 dated Jan. 16, 2018, 10 pgs.
International Search Report and Written Opinion issued in corresponding PCT Patent Appln. Serial No. PCT/US19/46410 dated Nov. 8, 2019, 7 pgs.
Office Action issued in U.S. Appl. No. 15/601,820, dated Feb. 27, 2019 (26 pages).
Office Action issued in U.S. Appl. No. 15/601,820, dated Aug. 27, 2018 (28 pages).
Yonkee, B.P., et al., "Demonstration of a III-nitride edge-emitting laser diode utilizing a GaN tunnel junction contact", Optics Express, vol. 24, No. 7, pp. 7816-7822, Apr. 2016.
Young, Lee W., Authorized officer, International Searching Authority, Written Opinion of the International Searching Authority, International Patent Application Serial No. PCT/US06/47448, completion date: Oct. 30, 2008.
Young, Lee W., Authorized officer, International Searching Authority, International Search Report, International Patent Application Serial No. PCT/US06/47448, search date: Nov. 1, 2008.
Polyimide properties data sheet, www.mit.edu, Oct. 27, 2004 (Year 2004).
Sunstone, FR-4 PCB Material, Mar. 14, 2017 (Year 2017).
European Search Report issued in application No. 18173282.7-1211, dated May 20, 2021 (6 pgs).
Office Action issued in U.S. Appl. No. 16/895,961, dated Dec. 10, 2021 (39 pgs).
Notice of Allowance issued in U.S. Appl. No. 16/734,133, dated Dec. 3, 2021 (9 pgs).
Official Action issued in corresponding U.S. Appl. No. 16/539,889, dated Aug. 25, 2021, 25 pages.
Official Action issued in corresponding U.S. Appl. No. 16/539,889, dated Dec. 8, 2021, 19 pages.
Watson, Edward, Walter Whitaker, Christopher Brewer, and Scott Harris "Implementing Optical Phased Array Beam Steering with Cascaded Microlens Arrays" IEEE Proceedings, IEEE Aerospace Conference; Mar. 9-16, 2002 (Year: 2002).
RO30000 Series Laminates, Rogers Corporation Data sheet (year 2020).
Chen et al., High-T Polymer Dec. 25, 2017 (Year 2017).
Robin K. Huang, Bien Chann, James Burgess, Michael Kaiman, Robert Overman, John D. Glenn, and Parviz Tayebati "Direct diode lasers with comparable beam quality to fiber, CO2, and solid state lasers", Proc. SPIE 8241, High-Power Diode Laser Technology and Applications X, 824102 (Feb. 8, 2012); https://doi.org/10.1117/12.907161 (abstract only).
U.S. Appl. No. 11/829,030, filed Jul. 26, 2007.
U.S. Appl. No. 09/556,767, filed Apr. 24, 2020.
U.S. Appl. No. 09/170,491, filed Oct. 13, 1998.
U.S. Appl. No. 12/105,126, filed Apr. 17, 2008.
U.S. Appl. No. 12/648,141, filed Dec. 28, 2009.
U.S. Appl. No. 14/728,923, filed Jun. 2, 2015.
U.S. Appl. No. 15/167,748, filed May 27, 2016.
U.S. Appl. No. 15/363,874, filed Nov. 29, 2016.
U.S. Appl. No. 15/601,820, filed May 22, 2017.
U.S. Appl. No. 11/299,029, filed Dec. 9, 2005.
U.S. Appl. No. 16/539,889, filed Aug. 13, 2019.
U.S. Appl. No. 16/540,961, filed Aug. 14, 2019.
U.S. Appl. No. 16/734,133, filed Jan. 3, 2020.
U.S. Appl. No. 16/895,931, filed Jun. 8, 2020.

\* cited by examiner

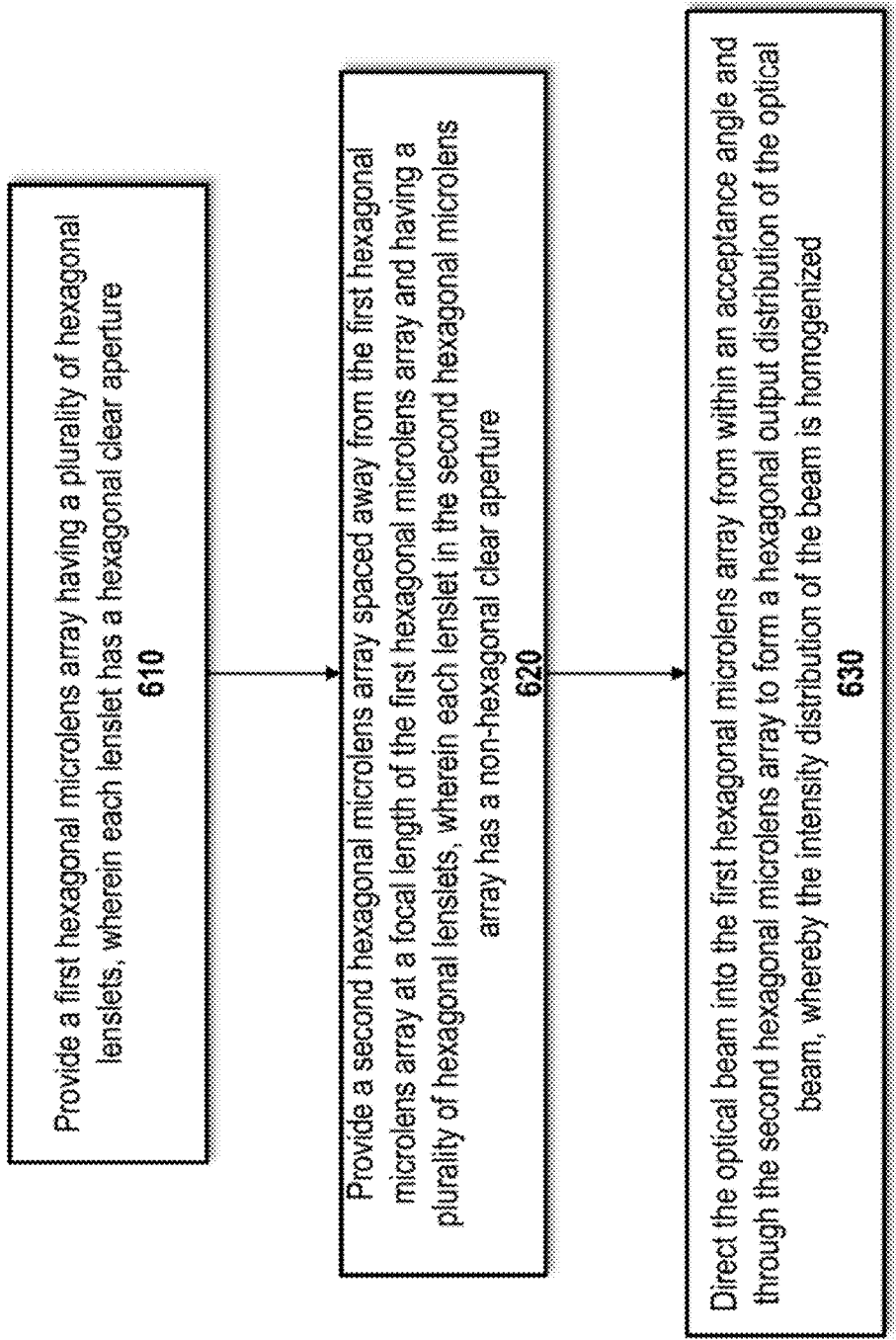

ASYMMETRIC INPUT INTENSITY HEXAGONAL HOMOGENIZER

CROSS REFERENCE TO RELATED APPLICATION

This application claims benefit to U.S. Provisional Patent Application Ser. No. 62/901,078, filed Sep. 16, 2019, the contents of which are incorporated herein by reference.

FIELD OF THE DISCLOSURE

The present disclosure relates generally to optical beam homogenizers and more particularly to asymmetric beam homogenizers.

BACKGROUND OF THE DISCLOSURE

Optical systems often produce beams having heterogeneous intensity distributions. The intensity distributions of the beams may be heterogeneous in several ways. For example, the intensity distribution for a circular beam may be asymmetric along different axes of the beam, with greater divergence along one axis than along the other. As another example, the intensity distribution may be uneven along the radial footprint of the beam—for instance, in a Gaussian beam—with greater intensity closer to the center of the beam and reduced intensity going radially outward. Additionally, some beams develop an asymmetric intensity distribution after collimation. For instance, for high power laser diode arrays, the intensity distribution is characteristically asymmetric after fast axis collimation.

Beam homogenizers are often used to correct heterogeneous beams to a suitable degree of homogeneity. After a beam is generated, it may be conditioned by expanding or focusing the beam in order to distribute the intensity more evenly. However, beam conditioning systems can add complexity, cost, and size to an optical system. Moreover, the angular acceptance of typical homogenizers is limited by the output shape. Thus, an input beam having an asymmetric intensity distribution may exit the homogenizer having an output outside of the desired output shape.

Thus, a heretofore unaddressed need exists in the industry to address the aforementioned deficiencies and inadequacies.

SUMMARY OF THE DISCLOSURE

Embodiments of the present disclosure provide an apparatus for homogenizing an optical beam. Briefly described, in architecture, one embodiment of the apparatus, among others, can be implemented as follows. An optical beam homogenizer includes a first hexagonal microlens array having a plurality of hexagonal lenslets. Each lenslet has a hexagonal clear aperture. A second hexagonal microlens array is spaced away from the first hexagonal microlens array at a focal length of the first hexagonal microlens array and has a plurality of hexagonal lenslets. Each lenslet in the second hexagonal microlens array has a non-hexagonal clear aperture.

In one aspect of the apparatus, each lenslet in the second hexagonal microlens array has a rectangular clear aperture.

In another aspect of the apparatus, each lenslet in the second hexagonal microlens array has an elliptical clear aperture.

In another aspect of the apparatus, for each lenslet in the second hexagonal microlens array, a ratio of an output width to an output height of the clear apertures is determined by an angle of the first hexagonal microlens array relative to the second hexagonal microlens array. In a particular aspect, the ratio is about 3.464 to 1. In another particular aspect, the ratio is about 8.083 to 1. In another particular aspect, the ratio is about 15.011 to 1.

In another aspect of the apparatus, the lenslets in the first hexagonal microlens array are concentric with the lenslets in the second hexagonal microlens array.

In another aspect of the apparatus, the lenslets in the first hexagonal microlens array are nonconcentric with the lenslets in the second hexagonal microlens array.

In another aspect of the apparatus, light refracted through a lenslet in the first hexagonal microlens array propagates through a plurality of lenslets in the second hexagonal microlens array.

The present disclosure also can be viewed as providing methods of homogenizing an intensity distribution of an optical beam. In this regard, one embodiment of such a method, among others, can be broadly summarized by the following steps: providing a first hexagonal microlens array having a plurality of hexagonal lenslets, wherein each lenslet has a hexagonal clear aperture; providing a second hexagonal microlens array spaced away from the first hexagonal microlens array at a focal length of the first hexagonal microlens array and having a plurality of hexagonal lenslets, wherein each lenslet in the second hexagonal microlens array has a non-hexagonal clear aperture; and directing the optical beam into the first hexagonal microlens array from within an acceptance angle and through the second hexagonal microlens array to form a hexagonal output distribution of the optical beam, whereby the intensity distribution of the beam is homogenized.

In one aspect of the method, each lenslet in the second hexagonal microlens array has a rectangular clear aperture.

In another aspect of the method, each lenslet in the second hexagonal microlens array has an elliptical clear aperture.

In another aspect of the method, for each lenslet in the second hexagonal microlens array, a ratio of an output width to an output height of the clear apertures is determined by an angle of the first hexagonal microlens array relative to the second hexagonal microlens array. In a particular aspect, the ratio is about 3.464 to 1. In another particular aspect, the ratio is about 8.083 to 1. In another particular aspect, the ratio is about 15.011 to 1.

In another aspect of the method, the lenslets in the first hexagonal microlens array are concentric with the lenslets in the second hexagonal microlens array.

In another aspect of the method, the lenslets in the first hexagonal microlens array are nonconcentric with the lenslets in the second hexagonal microlens array.

In another aspect of the method, light refracted through a lenslet in the first hexagonal microlens array propagates through a plurality of lenslets in the second hexagonal microlens array.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a flowchart illustrating a method of homogenizing an intensity distribution of an optical beam, in accordance with the first exemplary embodiment of the present disclosure.

DETAILED DESCRIPTION

Figure 1:
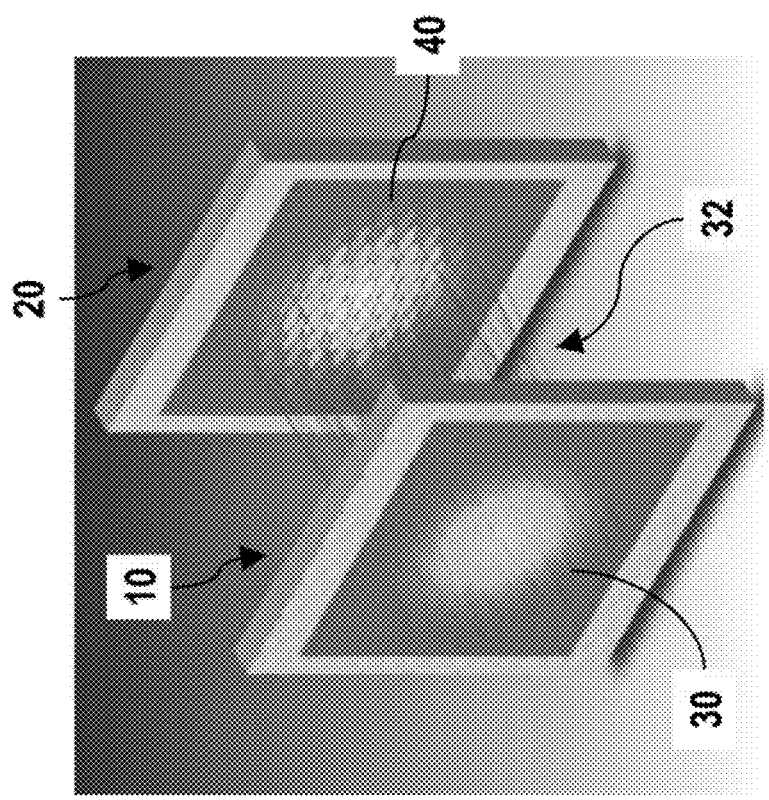
FIG. 1 is an isometric view of the optical beam homogenizer, in accordance with a first exemplary embodiment of the present disclosure.

FIG. 1 is an isometric view of the optical beam homogenizer 1, in accordance with a first exemplary embodiment of the present disclosure. The optical beam homogenizer 1 (hereinafter "homogenizer") 1 includes a first hexagonal microlens array 10 having a plurality of hexagonal lenslets. Each lenslet has a hexagonal clear aperture. A second hexagonal microlens array 20 is spaced away from the first hexagonal microlens array 10 at a focal length of the first hexagonal microlens array 10 and has a plurality of hexagonal lenslets. Each lenslet in the second hexagonal microlens array has a non-hexagonal clear aperture.

The first hexagonal microlens array (hereinafter "first array") 10 may be a microlens array with each lenslet having a hexagonal clear aperture. The first array 10 may be made from any suitable material, including fused silica, polymer, glass, or any combination thereof. The first array 10 may be any suitable size and may contain any suitable number of lenslets for homogenizing the input beam 30 from an optical system. The lenslets may be arranged in a hexagonal array. In one example, the lenslets may be diffraction limited. In another example, the lenslets may have any suitable pitch, focal lengths, or ratios for the desired application. In one particular example, the pitch of the lenslets may be between 0.3 mm and 2 mm. In another particular example, the focal length may be between 1 mm and 50 mm. The divergence angle of each lenslet may be a function of the pitch and focal length of each lenslet.

The second hexagonal microlens array 20 (hereinafter "second array") may be spaced away from the first array 10 at a distance corresponding to the focal length of the first array 10. In one example, the second array 20 may be a microlens array with each lenslet having a non-hexagonal clear aperture. For instance, the clear apertures of each lenslet in the second array 20 may be rectangular or elliptical. This may allow a ratio of the output width to the output height of the clear apertures to be controllable according to the angular relation of the first and second arrays 10, 20. This is discussed in greater detail in FIGS. 5A-5C, below. The second array 20 may be made from any suitable material, including fused silica, polymer, glass, or any combination thereof. The second array 20 may be any suitable size and may contain any suitable number of lenslets for operation with the first array 10 and the input beam 30 from the optical system. In a preferred embodiment, the lenslets may be arranged in a hexagonal array, although in other embodiments, the lenslets can be rectangular or elliptical, and they are centered on the same grid as the first array, or concentric to the first array. In one example, the lenslets in the second array 20 may be diffraction limited and may have any suitable pitch, focal length, or ratio for the desired application. In one particular example, the pitch of the lenslets may be between 0.3 mm and 2 mm. In another particular example, the focal length may be between 1 mm and 50 mm. The divergence angle of each lenslet may be a function of the pitch and focal length of each lenslet.

An input beam 30 may be a beam propagating from an optical system (not shown) operating with the homogenizer 1. The input beam 30 may be directed into the first array 10 and through the homogenizer 1. The first array may project the input intensity distribution to each lenslet of the second array 20. This may divide the input beam 30 into a number of beamlets 32 corresponding to each of the lenslet in the first array 10. The second array 20 may project the irradiance distribution of each lenslet in the first array to the far field, creating a homogenous distribution in the far field.

The homogenizer 1 may be used with any suitable optical system requiring homogenization. For instance, high power laser diode arrays generally create beams having asymmetric intensity distributions. In another example, line-narrowed excimer lasers in the ultraviolet range may also benefit from homogenization. Particular applications may include projector illumination and industrial applications such as heat treatment. In another example, the homogenizer 1 may be used in applications requiring homogenized illumination, such as automotive headlight lighting.

In one example, the homogenizer 1 may include more than two microlens arrays. In another example, the homogenizer 1 may include the first and second microlens arrays 10, 20 in addition to other optical surfaces. For instance, the homogenizer 1 may include optical surfaces for beam conditioning before or after the microlens arrays 10, 20.

Figure 2:
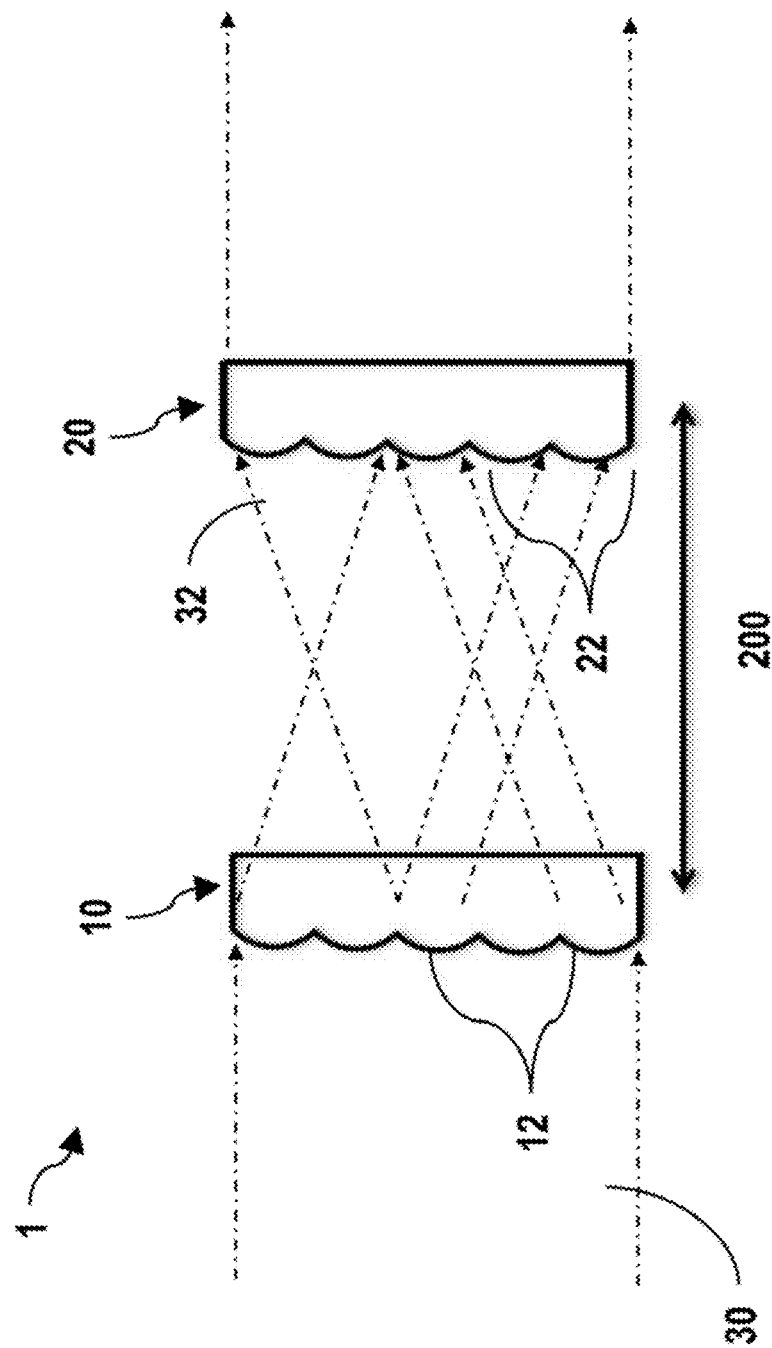
FIG. 2 is a cross-sectional side view illustration of the optical beam homogenizer of FIG. 1, in accordance with the first exemplary embodiment of the present disclosure.

FIG. 2 is a cross-sectional side view illustration of the optical beam homogenizer 1 of FIG. 1, in accordance with the first exemplary embodiment of the present disclosure. The first array 10 may be in optical alignment with the second array 20. The second array 20 may be spaced away from the first array 10 at a focal length 200 of the first array 10. This may allow the light from the input beam 30 to be refracted through the first array 10 and into the second array 20. The first array 10 may include a plurality of lenslets 12 configured and oriented as described in FIG. 1. The second array 20 may include a plurality of lenslets 22 oriented and configured as described in FIG. 1. Light from the input beam 30 may be refracted by the lenslets 12 in the first array 10, creating a plurality of beamlets 32 corresponding to the lenslets 12. The beamlets 32 propagate to the lenslets 22 in the second array 20, where they are refracted to the far field as an improved homogenized beam.

The lenslets 12 in the first array 10 may project the input intensity distribution of the input beam 30 to the lenslets 22 in the second array 20. All of the power that passes through the clear aperture of each lenslet 22 in the second array 20 may be transferred to the hexagonal output intensity distribution. Moreover, the physical dimensions of the lenslets 22 in the second array 20 may determine the input intensity acceptance.

FIGS. 3A-3D show exemplary graphs of the radiant flux through the homogenizer 1. The graphs may refer to aspects of the homogenizer 1 as discussed relative to FIGS. 1-2, above.

Figure 3A:
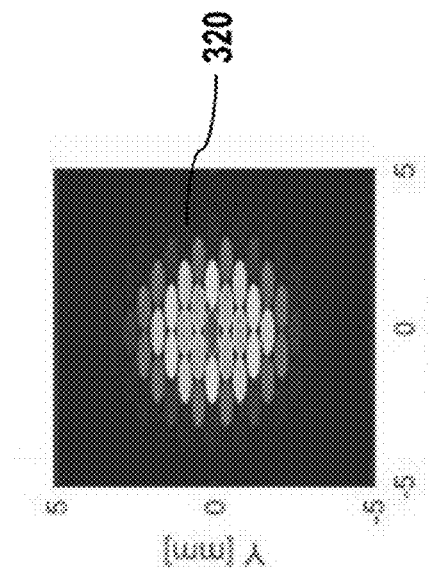
FIG. 3A is a graph of the irradiance of an exemplary beam directed into the optical beam homogenizer, in accordance with the first exemplary embodiment of the present disclosure.

FIG. 3A is a graph of the irradiance 310 of an exemplary beam directed into the optical beam homogenizer, in accordance with the first exemplary embodiment of the present disclosure. Many optical systems emit beams having Gaussian intensity distributions, where the intensity of the beam is significantly higher near the center of the beam. Additionally, the illuminated field may include zero-order hotspots or other areas on uneven, asymmetrical, or heterogeneous intensity distribution.

Figure 3B:
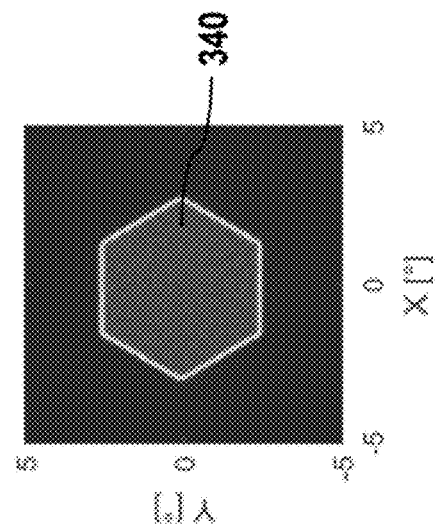
FIG. 3B is a graph of the output exitance of the beam of FIG. 3A, in accordance with the first exemplary embodiment of the present disclosure.

FIG. 3B is a graph of the output exitance 320 of the beam of FIG. 3A, in accordance with the first exemplary embodiment of the present disclosure. The second array 20 may project the irradiance distribution 310 from each lenslet 212 of the first array 10. The resultant shape of the output exitance 320 beam may be hexagonal in accordance with the shape and structure of the first array 10.

Figure 3C:
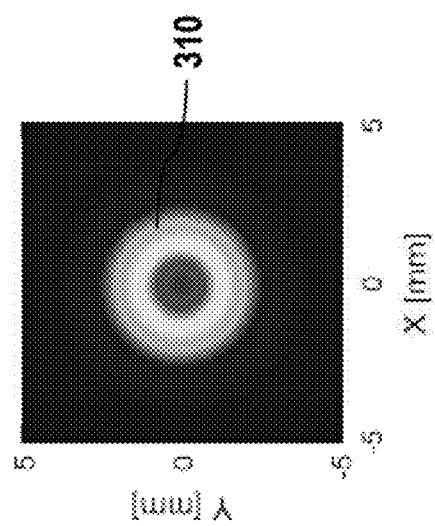
FIG. 3C is a graph of the input intensity of the beam of FIG. 3A, in accordance with the first exemplary embodiment of the present disclosure.

FIG. 3C is a graph of the input intensity 330 of the beam of FIG. 3A, in accordance with the first exemplary embodiment of the present disclosure. The input intensity 330 may be asymmetric with respect to the X and Y-axes, as is common in certain emitters and arrays. FIG. 3C shows an input beam 30 having a greater intensity distribution along the X-axis than along the Y-axis.

Figure 3D:
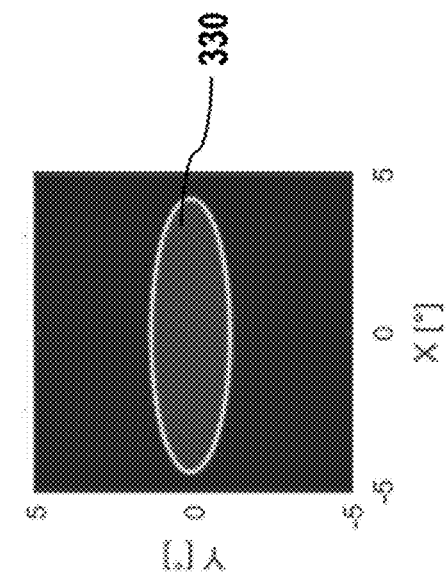
FIG. 3D is a graph of the output intensity of the beam of FIG. 3A, in accordance with the first exemplary embodiment of the present disclosure.

FIG. 3D is a graph of the output intensity 340 of the beam of FIG. 3A, in accordance with the first exemplary embodiment of the present disclosure. After propagating through the homogenizer 1, the input beam 30 has been reshaped and evenly distributed. The output intensity 340 is shown as a hexagon having a symmetric distribution relative to both the X and Y-axes.

Figure 4:
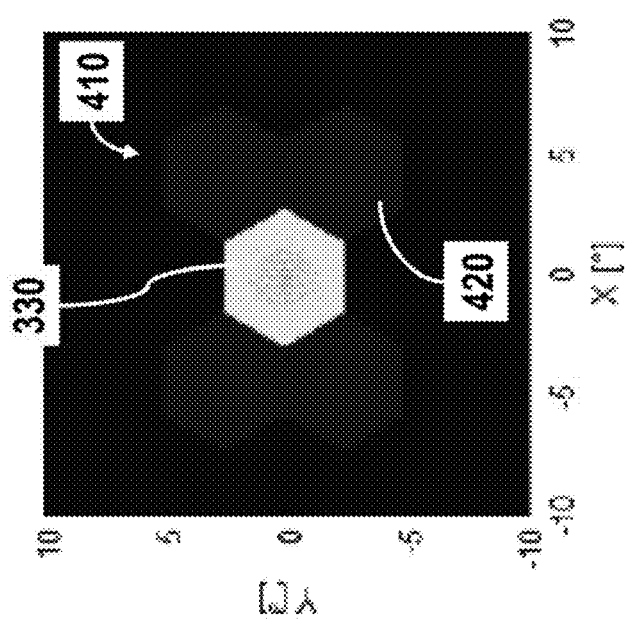
FIG. 4 is a plot showing the output intensity of a typical prior art homogenizer.

FIG. 4 is a plot showing the output intensity 410 of a typical prior art homogenizer. The output shape of a typical prior art homogenizer using microlens arrays is the same as the angular acceptance of the first microlens array element in the homogenizer. When the intensity of the input beam is asymmetric with respect to the X and Y-axes, as shown in FIG. 3C, this may lead to an undesired intensity distribution at the far field. For instance, in FIG. 4, a portion of the output intensity 330 is shown in a hexagonal distribution that is symmetric about both axes. However, due to the asymmetric nature of the input intensity and the greater angular distribution of the beam along the X-axis, there is also a portion of the output intensity 410 lying outside of the desired hexagonal distribution. As shown in FIG. 4, this portion of the output intensity 410 results in uneven hexagonal distributions at greater angular displacement in the far field. Power outside the acceptance angle ends up outside of the desired output hexagonal intensity distribution 330.

As shown in FIG. 3D, the homogenizer 1 described herein overcomes this issue. The first and second arrays 10, 20 may have an asymmetric angular acceptance which may be different than the output intensity shape. Thus, asymmetric sources may be distributed evenly and symmetrically at the output.

Figure 5A:
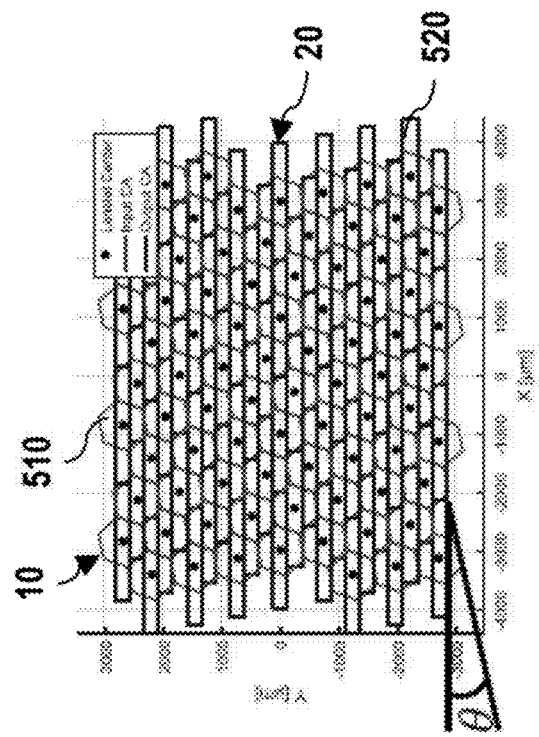
FIG. 5A-5C are diagrammatic illustrations showing the clear apertures of the first hexagonal microlens array in relation to the clear apertures of the second hexagonal microlens array.
Figure 5B:
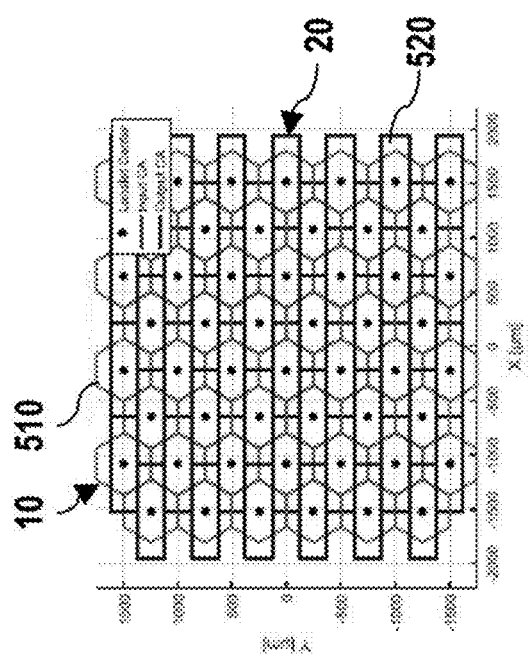
Figure 5C:
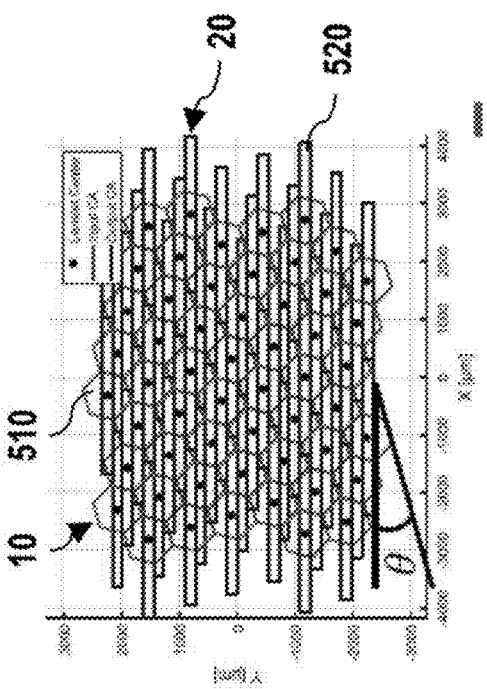

FIG. 5A-5C are diagrammatic illustrations showing the clear apertures of the first hexagonal microlens array in relation to the clear apertures of the second hexagonal microlens array. FIGS. 5A-5C may refer to the various aspects of the homogenizer 1 discussed relative to FIGS. 1-4, above. The homogenizer 1 may use lenslets 12 arranged in a first hexagonal microlens array 10. The lenslets 12 may have hexagonal clear apertures 510. The hexagonally packed lenslets with hexagonal clear apertures 510 may receive light from an input source. Lenslets 22 arranged in a second hexagonal microlens array 20 may be hexagonally packed with non-hexagonal clear apertures. FIGS. 5A-5C show the lenslets 22 in the second hexagonal microlens array 20 having rectangular clear apertures 520.

A ratio of an output width to an output height of the clear apertures of the second hexagonal microlens array 20 is determined by an angle of the first hexagonal microlens array 10 relative to the second hexagonal microlens array 20. In FIG. 5A, the angle of the first hexagonal microlens array 10 relative to the second hexagonal microlens array 20 is 0°. The ratio of the width to the height may be determined by the following equations:

$$\text{ratio} = 2\sqrt{3}\left(\frac{n^2}{3} + n + 1\right)$$

$$\theta = \tan^{-1}\frac{2n}{\sqrt{3} + (2+n)}$$

where n is the number of configurations and θ is the angular difference between the first and second hexagonal microlens arrays 10, 20.

Solving for n based on the angular difference of 0° in FIG. 5A gives a ratio of about 3.464:1. FIG. 5B is a diagram showing the first hexagonal microlens array 10 rotated at an angle of about 22.91° relative to the second hexagonal microlens array 20. The ratio based on this angular difference is about 8.083:1. FIG. 5C is a diagram showing the first hexagonal microlens array 10 rotated at an angle of about 34.9° relative to the second hexagonal microlens array 20. The ratio based on this angular difference is about 15.011:1.

The more asymmetric the input intensity is, the higher the ratio needed to homogenize the beam. For example, if the targeted homogenized output was a 3° hexagon and the input beam was 1°×8°, a 3.464:1 homogenizer may produce 42% of the power in the output homogenized beam. If a homogenizer having a ratio of 8.083:1 were used, the homogenizer may produce 100% of the power in the output homogenized beam.

The lenslets of the first hexagonal microlens array 10 may be concentric with the lenslets of the second hexagonal microlens array 20. In one example, the lenslets of the first hexagonal microlens array 10 may not be concentric with the lenslets of the second hexagonal microlens array 20. In one example, light refracted through one lenslet of the first hexagonal microlens array 10 may propagate through a plurality of lenslets of the second hexagonal microlens array 20.

FIG. 6 is a flowchart 600 illustrating a method of homogenizing an intensity distribution of an optical beam, in accordance with the first exemplary embodiment of the present disclosure. The method may be understood in reference to the homogenizer 1 and components described relative to FIGS. 1-5C, above. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 610 includes providing a first hexagonal microlens array having a plurality of hexagonal lenslets, wherein each microlens has a hexagonal clear aperture. The first hexagonal microlens array may be the first array described relative to FIGS. 1-2, and may comprise hexagonal lenslets arranged in a hexagonal orientation.

Step 620 includes providing a second hexagonal microlens array spaced away from the first hexagonal microlens array at a focal length of the first hexagonal microlens array and having a plurality of hexagonal lenslets, wherein each lenslet in the second hexagonal microlens array has a non-hexagonal clear aperture. The second hexagonal microlens array may be the second array described relative to FIGS. 1-2, and may comprise hexagonally-packaged lenslets arranged in a hexagonal orientation. The clear aperture of each lenslet may be non-hexagonal, for instance, rectangular or elliptical. The second hexagonal microlens array may be spaced apart from the first hexagonal microlens array at a distance corresponding to the focal length of the first hexagonal microlens array.

Step 630 includes directing the optical beam into the first hexagonal microlens array from within an acceptance angle and through the second hexagonal microlens array to form a hexagonal output distribution of the optical beam, whereby the intensity distribution of the beam is homogenized. The acceptance angle may be asymmetric with respect to the X and Y-axes. For example, the acceptance in the X-axis direction may be greater than in the Y-axis direction. An input beam having any intensity distribution, whether symmetrical or asymmetrical, may be directed into the first hexagonal microlens array and may be refracted by the lenslets to form a plurality of beamlets. The beamlets may be directed by the first hexagonal microlens array into the second hexagonal microlens array. The lenslets in the second hexagonal microlens array may refract the beamlets out of the homogenizer to produce a homogenous far field beam with a hexagonal shape and improved intensity distribution compared to the input beam.

The method may further include any other features, components, or functions disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An optical beam homogenizer, comprising:
   a first hexagonal microlens array having a plurality of hexagonal lenslets, wherein each lenslet has a hexagonal clear aperture; and
   a second hexagonal microlens array spaced away from the first hexagonal microlens array at a focal length of the first hexagonal microlens array and having a plurality of hexagonal lenslets, wherein each lenslet in the second hexagonal microlens array has a non-hexagonal clear aperture of a different shape than the first hexagonal clear aperture,
   wherein the hexagonal lenslets of the first hexagonal microlens array are rotatable relative to the hexagonal lenslets in the second hexagonal microlens array to adjust a ratio of an output width to an output height of a clear aperture of the lenslets of the second hexagonal microlens array, wherein an angle between the first hexagonal microlens array and the second hexagonal microlens array defines the output width and the output height of the clear apertures, and wherein the angle between the first hexagonal microlens array and the second hexagonal microlens array corresponds to an asymmetry of an input beam.

2. The optical beam homogenizer of claim 1, wherein each lenslet in the second hexagonal microlens array has a rectangular clear aperture.

3. The optical beam homogenizer of claim 1, wherein each lenslet in the second hexagonal microlens array has an elliptical clear aperture.

4. The optical beam homogenizer of claim 1, wherein the ratio has a value selected from the group consisting of 3.464 to 1, 8.083 to 1, and 15.011 to 1.

5. The optical beam homogenizer of claim 1, wherein the lenslets in the first hexagonal microlens array are nonconcentric with the lenslets in the second hexagonal microlens array.

6. The optical beam homogenizer of claim 1, wherein the lenslets in the first array and/or in the second array have a pitch of between 0.3 mm and 2 mm.

7. The optical beam homogenizer of claim 1, wherein the lenslets in the first array and/or in the second array have a focal length of between 1 mm and 50 mm.

8. The optical beam homogenizer of claim 1, wherein the first hexagonal microlens array is rotatable between a range of 0° and 34.9°.

9. The optical beam homogenizer of claim 1, wherein the angle of the first hexagonal microlens array is selected from the group consisting of 0°, 22.91°, and 34.9°.

10. A method of homogenizing an intensity distribution of an optical beam, comprising the following steps:
   providing a first hexagonal microlens array having a plurality of hexagonal lenslets, wherein each lenslet has a hexagonal clear aperture;
   providing a second hexagonal microlens array spaced away from the first hexagonal microlens array at a focal length of the first hexagonal microlens array and having a plurality of hexagonal lenslets, wherein each lenslet in the second hexagonal microlens array has a non-hexagonal clear aperture of a different shape than the first hexagonal clear aperture;
   rotating the hexagonal lenslets of the first hexagonal microlens array relative to the second hexagonal microlens array to adjust a ratio of an output width to an output height of the clear aperture of the lenslets of the second hexagonal microlens array, whereby an angle between the first hexagonal microlens array and the second hexagonal microlens array defines the output width and the output height of the clear apertures, and wherein the angle between the first hexagonal microlens array and the second hexagonal microlens array corresponds to an asymmetry of an input beam; and directing the optical beam into the first hexagonal microlens array from within an acceptance angle and through the second hexagonal microlens array to form a hexagonal output distribution of the optical beam, whereby the intensity distribution of the beam is homogenized.

11. The method of claim 10, wherein each lenslet in the second hexagonal microlens array has a rectangular clear aperture.

12. The method of claim 10, wherein each lenslet in the second hexagonal microlens array has an elliptical clear aperture.

13. The method of claim 10, wherein the ratio has a value selected from the group consisting of 3.464 to 1, 8.083 to 1, and 15.011 to 1.

14. The method of claim 10, wherein the lenslets in the first hexagonal microlens array are nonconcentric with the lenslets in the second hexagonal microlens array.

15. The method of claim 10, wherein the lenslets in the first array and/or in the second array have a pitch of between 0.3 mm and 2 mm.

16. The method of claim 10, wherein the lenslets in the first array and/or in the second array have a focal length of between 1 mm and 50 mm.

* * * * *